Dec. 26, 1950  D. M. DAVIDOFF  2,535,788
ELECTROMAGNETIC MACHINE
Filed Nov. 26, 1949

INVENTOR.
DAVID M. DAVIDOFF
BY
Carl Miller
ATTORNEY

Patented Dec. 26, 1950

2,535,788

UNITED STATES PATENT OFFICE 2,535,788

ELECTROMAGNETIC MACHINE

David M. Davidoff, Brooklyn, N. Y.

Application November 26, 1949, Serial No. 129,582

1 Claim. (Cl. 172—126)

This invention relates to an electro-magnetic machine.

It is an object of the present invention to provide an electro-magnetic machine utilizing electric coils for operating an armature which is carried upon a track by its supporting wheels and which causes a cranking action of a shaft which in turn operates a large driving gear connected to an electric generator that supplies electric current to a line and to the storage batteries which effect the operation of the machine and which is constructed of parts that are easy to make and assemble.

Other objects of the present invention are to provide an electro-magnetic machine which is of simple construction, inexpensive to manufacture, has a minimum number of parts, compact, produces large power output and efficient in operation.

Figure 1:
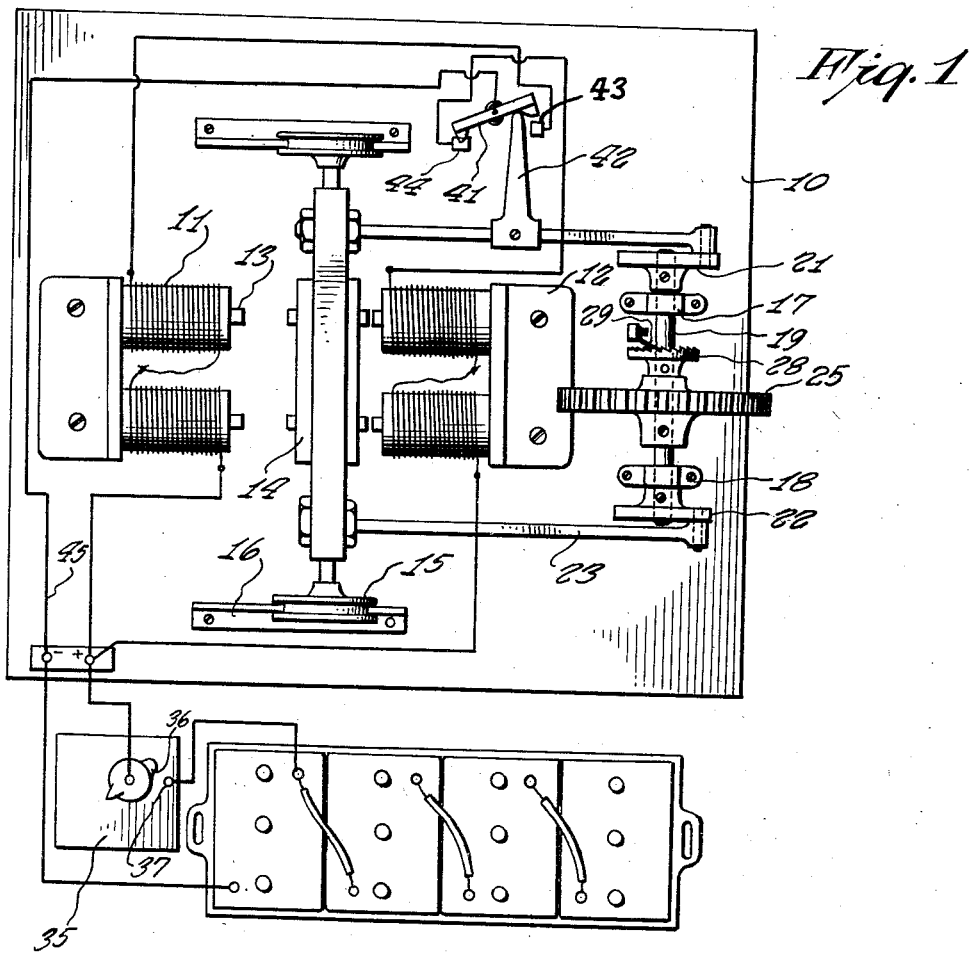

For other objects and for a better understanding of the invention, reference may be had to the following detailed description taken in connection with the accompanying drawing, in which Fig. 1 is a top plan view of the electro-magnetic machine and of the storage battery unit and control switch.

Figure 2:
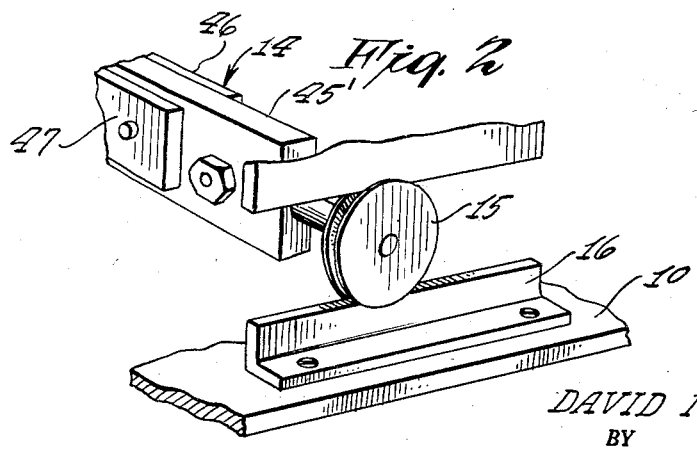

Fig. 2 is a fragmentary perspective view.

Referring now to the figures, 10 represents a base to which there is connected two electro-magnet units 11 and 12 laterally spaced from one another and having magnetic pole ends 13. Between these electro-magnets there is disposed an armature 14 which has on its ends pulley wheels 15 that are supported in track pieces 16. The armature can move in the space between the electro-magnets.

At one side of the base 10 are bracket supports 17 and 18 which support a shaft 19 for rotation. This shaft has cranks 21 and 22 on its respective ends which are connected by crank rods 23 respectively with the armature assembly 14. Accordingly, a driving action is effected by the armature 14 upon the shaft 19. The shaft 19 has a large output gear 25 from which power may be taken. A ratchet gear 28 is carried on the shaft 19 and pawl 29 engages with the ratchet gear to prevent the reversed rotation of the shaft and the large gear 25.

A switch 35 has on and off positions. When the switch arm 36 is turned to have engagement with terminal 37 leading to the battery, current is supplied to the electro-magnets from the battery.

On the base board 10 is a reversing switch 41 operated by an arm 42 on one of the crank rods 23. The reversing switch will first cause the current flow to contact terminal 43 and then through contact terminal 44 which respectively lead by wires to the respective electro-magnets 11 and 12. A ground wire 45 leads from the reversing switch 41 to the ground post of the storage battery.

When the machine is started, the switch arm 36 is turned to terminal 37 to utilize the storage battery current.

The armature assembly 14 has a non-magnetic bar 45' and magnetic plates 46 and 47 disposed respectively upon the opposite sides thereof. The armature assembly can be stopped at either end of its stroke and against either electro-magnet.

While various changes may be made in the detail construction, it shall be understood that such changes shall be within the spirit and scope of the present invention as defined by the appended claim.

Having thus set forth and disclosed the nature of my invention, what is claimed is:

An electro-magnetic machine comprising a base, electro-magnetic units mounted on the base in spaced relationship with one another, an armature assembly having wheels on the opposite ends thereof, track means for supporting said wheels, said armature assembly moveable between the electro-magnetic units and adapted to be attracted by the same, journal brackets mounted on the base, a shaft journalled in said journal brackets, an output gear on the shaft, cranks disposed on the opposite ends of the shaft, crank rods connected respectively from the cranks through the armature assembly and extending respectively at the opposite sides of one of the electro-magnetic units, a ratchet gear mounted on the shaft, a pawl connected to the base and engaging with the ratchet gear, a reversing switch connected to one of the crank rods to be operated by the same, electric source means, a control switch and electric wiring means connected between the control switch, the electric source, the electro-magnets and the reversing switch.

DAVID M. DAVIDOFF.

REFERENCES CITED

The following references are of record in the file of this patent:

UNITED STATES PATENTS

| Number | Name | Date |
|---|---|---|
| 776,826 | Caldwell | Dec. 6, 1904 |
| 1,881,015 | Ayers | Oct. 4, 1932 |
| 1,954,689 | Allen | Apr. 10, 1934 |

FOREIGN PATENTS

| Number | Country | Date |
|---|---|---|
| 447,658 | Great Britain | May 22, 1936 |